Oct. 16, 1923.
C. F. MONTAG
BOX
Filed July 3, 1922
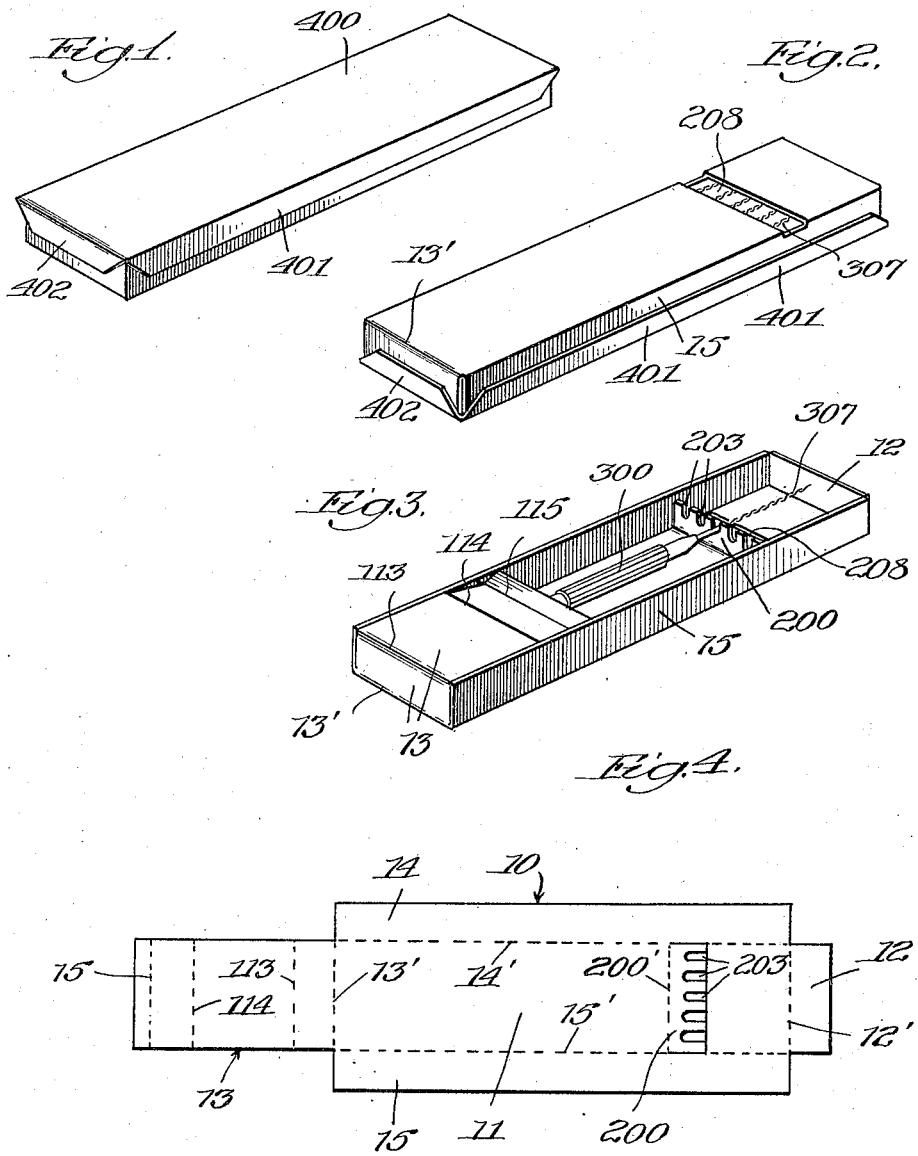
Inventor:
Christopher F. Montag, Patented Oct. 16, 1923.

1,471,050

UNITED STATES PATENT OFFICE.

CHRISTOPHER F. MONTAG, OF BLUE ISLAND, ILLINOIS, ASSIGNOR TO BLUE ISLAND SPECIALTY COMPANY, OF BLUE ISLAND, ILLINOIS, A CORPORATION OF ILLINOIS.

BOX.

Application filed July 3, 1922. Serial No. 572,533.

*To all whom it may concern:*

Be it known that I, CHRISTOPHER F. MONTAG, a citizen of the United States, residing at Blue Island, in the county of Cook and State of Illinois, have invented a new and useful Improvement in Boxes, of which the following is a specification.

This invention relates to improvements in boxes and more especially to a box adapted for containing broaches, drills, probes, burrs and the like, such as are used, for example, by dentists. My improved box can be easily and cheaply made and is neat in appearance. It is also constructed so that broaches or other instruments contained in it will be clamped and securely held in place. The box is also provided with an opening so that the number and sizes of broaches or other instruments in the box will be visible without removing the cover. Other features and advantages of my invention will appear more fully as I proceed with my specification.

In that form of device embodying the features of my invention shown in the accompanying drawings, Figure 1 is a view in perspective of the box, Fig. 2 is a view in perspective of the underside of the box showing the opening therein, Fig. 3 is a view in perspective of the box showing the cover removed, and Fig. 4 is a top plan view of a blank from which the box is formed.

As shown in the drawings, 10 indicates in general a blank stamped, cut or otherwise formed out of any suitable material such as sheet metal, from which the box is formed. It will be noted that this blank comprises a main rectangular part 11 having a short rectangular projection 12 at one end and a long rectangular projection 13 at the opposite end. The broken lines indicate the lines upon which the material is bent in forming the box. The part 11 has two extensions at its sides indicated by 14 and 15 respectively.

In forming the box, the side projections 14 and 15 are bent up to a vertical position on the lines 14' and 15' in order to form the sides of the box. The rectangular part 11 forms the bottom of the box. The short projection 12 is bent up to a vertical position on the line 12' to form one end of the box.

The long projection 13 is used to form one end of the box and also to form clamping means for holding the broaches and other instruments in the box in position. The end of the box and the clamping means are formed in the following manner. The projection 13 is bent upwardly to a vertical position on the line 13' and then bent downwardly again into a horizontal position on the line 113; the portion between the lines 13' and 113 forming the vertical end wall of the box. The end of the projection 13 is then bent downwardly on the line 114 and upwardly again on the line 115; so that the portion between the lines 113 and 114 lies in a horizontal position even with the top of the box. The end of the projection 13 beyond the line 114 then extends downwardly toward the bottom of the box and upwardly again, as shown in Fig. 3.

A rectangular tongue 200 is also cut in the bottom of the box and bent upwardly on the line 200' into a vertical position. The upper edge of this tongue 200 is provided with a series of notches 203.

A broach or burr, such as indicated by 300, is placed in the box by inserting the shank or handle of the broach under the extension 13. This extension is somewhat springy and its end may be sprung up allowing the shank or handle of the broach to be pushed under. It then holds the shank or handle of the broach against the bottom of the box and serves to yieldingly retain it in position in the box. The blade or cutting portion of the broach, as indicated by 307, is allowed to rest in one of the notches 203.

A rectangular cover of a suitable sort made out of any suitable material, such as sheet metal, is provided. I have here shown a cover comprising a rectangular part 400 adapted to fit over the box and having downwardly projecting sides 401 and ends 402, serving to hold it in position on the box.

In Fig. 2, the box is shown as it appears on the underside. It will be noted that the opening up of the tongue 200 leaves a rectangular opening 208 across the bottom of the box through which may be seen the points or blades 307 of the broaches or other instruments within the box. It is thus possible to readily see the number and sizes of instruments in the box without opening the same.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A box formed from a blank cut from a flat sheet of material, said blank having a main rectangular part adapted to form the bottom of the box, said main rectangular part having cut therein a tongue adapted to be bent upwardly to form a support in the box and leave a hole in the bottom thereof, side extensions adapted to be bent up to form the sides of the box, a short rectangular end extension adapted to be bent up to form one end of the box, and a long rectangular end extension adapted to be bent up to form the other end of the box, the part of said long extension projecting beyond said box-end being adapted to be bent downwardly to form a spring clamp in conjunction with the bottom of the box.

2. A box formed from a blank cut from a flat sheet of material, said blank having a main rectangular part adapted to form the bottom of the box, said main rectangular part having cut therein a notched tongue adapted to be bent upwardly to form a support in the box and leave a hole in the bottom thereof, side extensions adapted to be bent up to form the sides of the box, a short rectangular end extension adapted to be bent up to form one end of the box, and a long rectangular end extension adapted to be bent up to form the other end of the box, the part of said long extension projecting beyond said box-end being adapted to be bent downwardly to form a spring clamp in conjunction with the bottom of the box.

3. A box formed from a blank cut from a flat sheet of material, said blank having a main part adapted to form the bottom of the box, said main part having cut therein a tongue adapted to be bent upwardly to form a support in the box and leave a hole in the bottom thereof, and a long extension adapted to be bent up to form one end of the box, the part of said long extension projecting beyond said box-end being adapted to be bent downwardly to form a spring clamp in conjunction with the bottom of the box.

4. A box formed from a blank cut from a flat sheet of material, said blank having a main rectangular part adapted to form the bottom of the box, said main rectangular part having cut therein a tongue adapted to be bent upwardly to form a support in the box and leave a hole in the bottom thereof, and a long extension adapted to be bent up to form one end of the box, the part of said long extension projecting beyond said box-end being adapted to be bent downwardly to form a spring clamp in conjunction with the bottom of the box.

5. A box formed from a blank cut from a flat sheet of material, said blank having a main rectangular part adapted to form the bottom of the box, said main rectangular part having cut therein a tongue adapted to be bent upwardly to form a support in the box and leave a hole in the bottom thereof, and a long rectangular extension adapted to be bent up to form one end of the box, the part of said long extension projecting beyond said box-end being adapted to be bent downwardly to form a spring clamp in conjunction with the bottom of the box.

6. A box with a clamp at one end adapted to yieldingly hold instruments contained within the box, a support attached to the bottom of the box adapted to hold said instruments in spaced relation, and a hole in the bottom of the box adapted to give a view of the number and sizes of the instruments contained within the box.

Witness my hand and seal this 28 day of June, 1922.

CHRISTOPHR F. MONTAG. [L. S.]